(12) United States Patent
Zhu et al.

(10) Patent No.: US 7,096,179 B2
(45) Date of Patent: Aug. 22, 2006

(54) TEXT-BASED AUTOMATIC CONTENT CLASSIFICATION AND GROUPING

(75) Inventors: Weiyu Zhu, Urbana, IL (US); Shih-Ping Liou, West Windsor, NJ (US); Candemir Toklu, Plainsboro, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 564 days.

(21) Appl. No.: 09/949,868

(22) Filed: Sep. 10, 2001

(65) Prior Publication Data

US 2003/0065502 A1 Apr. 3, 2003

Related U.S. Application Data

(60) Provisional application No. 60/312,437, filed on Aug. 15, 2001.

(51) Int. Cl.
*G06F 17/20* (2006.01)
*G06F 17/27* (2006.01)
*G06F 17/30* (2006.01)
*G06F 7/00* (2006.01)

(52) U.S. Cl. .................... 704/1; 704/9; 707/2
(58) Field of Classification Search .............. 704/1, 704/9
See application file for complete search history.

(56) References Cited

U.S. PATENT DOCUMENTS

| | | | | |
|---|---|---|---|---|
| 5,371,807 A | * | 12/1994 | Register et al. | 382/159 |
| 5,440,481 A | * | 8/1995 | Kostoff et al. | 707/5 |
| 5,642,518 A | * | 6/1997 | Kiyama et al. | 704/7 |
| 5,873,056 A | * | 2/1999 | Liddy et al. | 704/9 |
| 6,094,653 A | * | 7/2000 | Li et al. | 707/6 |
| 6,253,169 B1 | * | 6/2001 | Apte et al. | 704/9 |
| 6,332,143 B1 | * | 12/2001 | Chase | 707/100 |
| 6,502,065 B1 | * | 12/2002 | Imanaka et al. | 704/9 |
| 6,507,829 B1 | * | 1/2003 | Richards et al. | 706/45 |
| 2002/0022956 A1 | * | 2/2002 | Ukrainczyk et al. | 704/9 |
| 2003/0069877 A1 | * | 4/2003 | Grefenstette et al. | 707/2 |

FOREIGN PATENT DOCUMENTS

| | | |
|---|---|---|
| EP | 0889417 | 7/1999 |
| WO | WO 0045291 | 3/2000 |
| WO | WO 0039707 | 6/2000 |

OTHER PUBLICATIONS

Toklu et al., "Videoabstract: A Hybrid Approach to Generate Semantically Meaningful Video Summaries," 2000 IEEE.
Dagan et al., "Mistake-Driven Learning in Text Categorization," EMNLP-97, 2nd Conference on Empirical Methods in Natural Language Processing, Aug. 1997.
Yasuo Ariki, et al., "A TV News Retrieval System with Interactive Query Functions," Jun. 24, 1997 *Proceedings of the IFCIS International Conference on Cooperative Information Systems,, COOPIS*, pp. 184-192.

(Continued)

*Primary Examiner*—W. R. Young
*Assistant Examiner*—Matthew J. Sked
(74) *Attorney, Agent, or Firm*—Donald B. Paschburg; F. Chau & Associates, LLC

(57) ABSTRACT

A method of content grouping based on a corresponding text includes reading from a content list file for a plurality of content groups, and extracting a key phrase set for each content group. The method includes determining, for each content group, a unique score and a non-unique score, determining a unique threshold and a non-unique threshold, and selecting a content group according to a comparison between the scores and the thresholds.

13 Claims, 5 Drawing Sheets

OTHER PUBLICATIONS

Boon-Lock Yeo, et al., "Visual Content Highlighting via Automatic Extraction of Embedded Captions on MPEG Compressed Video," *Proceedings of the SPIE, SPIE, Bellingham, VA, US*, vol. 2668, 1996, pp. 38-47.

Weiyu Zhu, et al., Automatic News Video Segmentation and Categorization Based on Closed-Captioned Text, *Multimedia and Expo, 2001, ICME, 2001. IEEE International Conference on Aug. 22-25, 2001*, Piscataway, NJ, USA, IEEE, Aug. 22, 2001, pp. 829-832.

\* cited by examiner

TEXT-BASED AUTOMATIC CONTENT CLASSIFICATION AND GROUPING

This application claims the benefit of U.S. Provisional Application No. 60/312,437, filed Aug. 15, 2001.

BACKGROUND OF THE INVENTION

1. Field of the Invention

The present invention relates to multimedia information retrieval and more particularly to automatic news story classification and relevant story grouping.

2. Discussion of the Prior Art

Video organization is an important step in content-based indexing of video archives. The objective of video organization is to capture the semantic structure of a video in a form which is meaningful to the user.

One proposed method of classifying video content includes manually indexing content in order to achieve a desirable quality of classification and grouping. However, this method can be time consuming and expensive.

Another proposed method of content classification is the Multimedia Video News Organizer, written by Siemens Corporate Research, Inc. The organizer automatically processes video, creating multimedia video summaries, while providing interfaces for verification, correction, and augmentation of the automatically generated story segments and extracted multimedia content. The interface can be provided by various functions, for example, Java scripts including TreeCC.java, ShotTree.java, and TreeOrg.java. These functions are interactive browsing interfaces that allow a user to revise automatically constructed story units. According to the automatic video summary generation method, closed-captioned text often lags behind the corresponding spoken words. Therefore, a method of closed-captioned text alignment is provided.

Closed-captioning is transmitted with a television signal, embedded in the line 21 data area in the vertical blanking interval. Captioning can also be supplied over, for example, the Internet. Closed-captioning has been used in at least three different areas: to aid hearing-impaired television viewers; to convey content in noisy environments; and aid in educational settings, particularly in learning languages.

Presently, no system or method is known to exist using majority voting or likelihood summation methods for classifying content according to a textual signal. Therefore, a need exists for an automatic content classification and relevant content grouping.

SUMMARY OF THE INVENTION

According to an embodiment of the present invention, a method is provided for news story classification. The method includes receiving text corresponding to content, and parsing noun phrases and proper nouns from the text into a plurality of feature items. The method assigns each different feature item a unique code, and classifies the content according to a frequency of occurrence the feature items in the content.

Classifying further includes determining a significance of each feature item, voting for a class upon determining that the significance of a feature item to be in accordance with a threshold, wherein the vote goes to a class having the feature item, and determining a class having a greatest number of votes among all classes.

Classifying includes determining for the content, a sum of a plurality of weights, wherein each weight corresponds to a feature item, determining a likelihood score for each class, and assigning the content to a class upon comparing the sum to the likelihood score.

The content is one of web page content and news stories. The text is provided by a closed-caption.

According to an embodiment of the present invention, a method of content grouping according to a corresponding text is provided. The method includes reading from a content list file for a plurality of content groups, extracting a key phrase set for each content group, and determining a set of unique key phrases and a set of non-unique key phrases from each group.

The method includes determining, for each content group, a unique score and a non-unique score, determining a unique threshold and a non-unique threshold, and selecting a content group according to a comparison between the scores and the thresholds.

The unique score is determined according to a sum of the length of the set of unique key phrases, wherein the set includes zero or more unique key phrases. The non-unique score is determined according to a sum of the length of the set of non-unique key phrases, wherein the set includes zero or more non-unique key phrases. The method includes adjusting the unique score and non-unique score by a predefined factor. The factor is $4\log(m)+1$, where m is the number of components in that content group. The factor makes the grouping more favorable to the large set of content groups.

Selecting further includes comparing the unique score to the unique threshold and selecting a content group including the unique score upon determining the unique score to be in accordance with the unique threshold. The method includes comparing the non-unique score to the non-unique threshold upon determining that the unique score is not in accordance with the unique threshold, and selecting a content group including the non-unique score upon determining the non-unique score to be in accordance with the non-unique threshold. The method creates a new content group upon determining that neither score is in accordance with its corresponding threshold.

The content is one of web page content and news stories. The text is provided by a closed-caption. The key phrases include at least one noun.

According to an embodiment of the present invention, a program storage device is provided readable by machine, tangibly embodying a program of instructions executable by the machine to perform method steps for content grouping based on a corresponding text. The method includes reading from a content list file for a plurality of content groups, and extracting a key phrase set for each content group. The method includes determining, for each content group, a unique score and a non-unique score, determining a unique threshold and a non-unique threshold, and selecting a content group according to a comparison between the scores and the thresholds.

The unique score is determined according to a sum of the length of the set of unique key phrases, wherein the set includes zero or more unique key phrases. The non-unique score is determined according to a sum of the length of the set of non-unique key phrases, wherein the set includes zero or more non-unique key phrases.

The method includes adjusting the unique score and non-unique score by a defined factor. The factor is $4\log(m)+1$, where m is the number of components in that content group, to make the grouping more favorable to the large set of content groups.

Selecting further includes comparing the unique score to the unique threshold and selecting a content group including the unique score upon determining the unique score to be in accordance with the unique threshold. The method includes comparing the non-unique score to the non-unique threshold upon determining that the unique score is not in accordance with the unique threshold, and selecting a content group including the non-unique score upon determining the non-unique score to be in accordance with the non-unique threshold. The method creates a new content group upon determining that neither score to be in accordance with its corresponding threshold.

According to another embodiment of the present invention, a program storage device is provided readable by machine, tangibly embodying a program of instructions executable by the machine to perform method steps for content classification. The method includes receiving text corresponding to content, and parsing noun phrases and proper nouns from the text into a plurality of feature items. The method further includes assigning each different feature item a unique code, and classifying the content according to a frequency of occurrence the feature items in the content.

BRIEF DESCRIPTION OF THE DRAWINGS

Preferred embodiments of the present invention will be described below in more detail, with reference to the accompanying drawings.

DETAILED DISCUSSION OF PREFERRED EMBODIMENTS

The present invention presents a method for closed-caption-based automatic news classification and relevant story grouping. The method includes majority voting-based and likelihood summation-based story classification (bayes-2 and bayes-3, respectively). The method further includes a key phrase-based relevant story grouping.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

News story classification assigns a class label to a story. Relevant story grouping retrieves related stories from the database. The present invention has achieved an average classification accuracy rate of 79% for 425 (80% training and 20% testing) pieces of CNN® news stories (8 classes).

Figure 1:
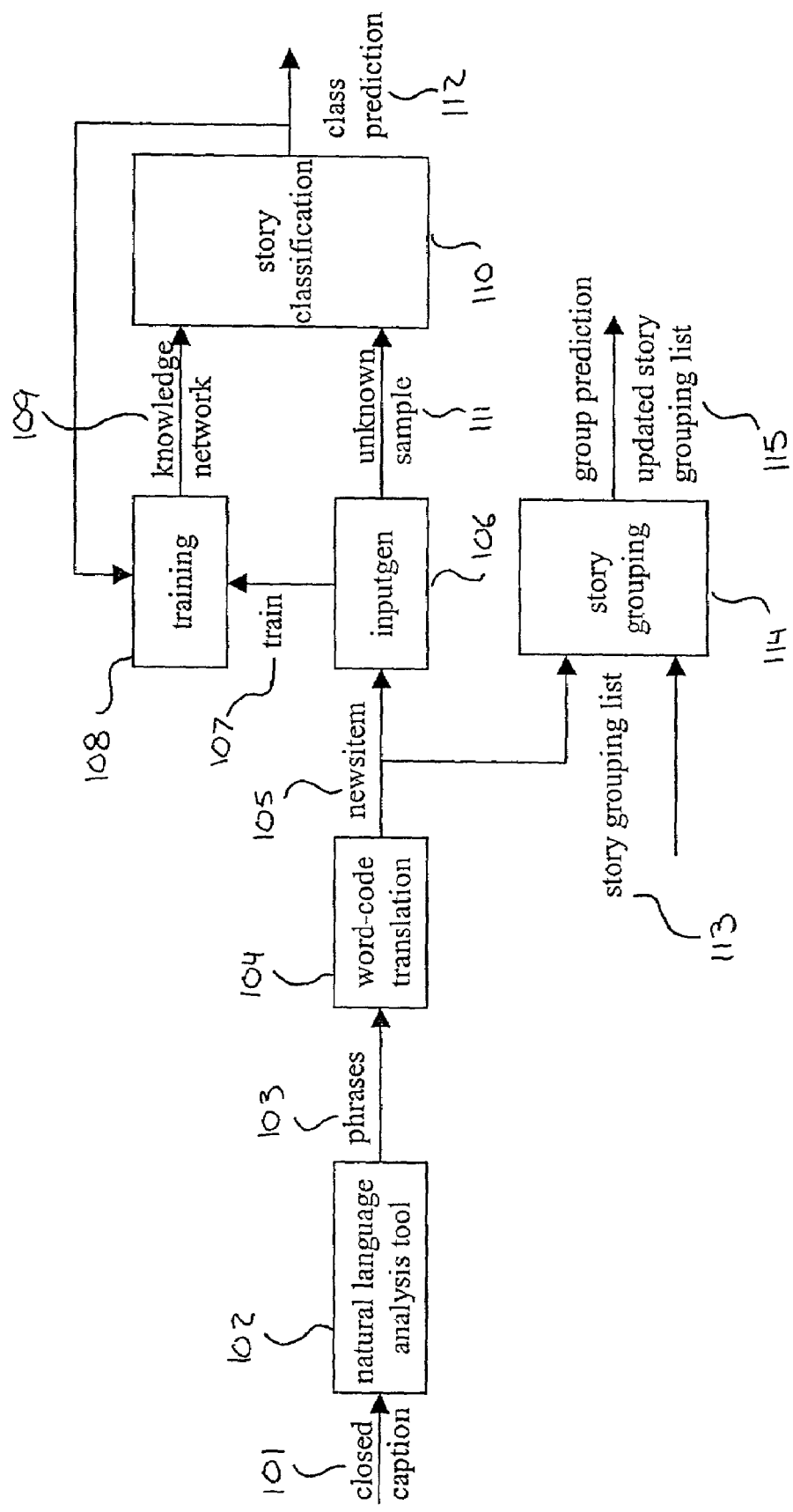
FIG. 1 is a flow chart for story classification and grouping according to an embodiment of the present invention.

Source information for the story classification and grouping is supplied by a closed-caption, stored as the file "cclist.txt". FIG. 1 shows the information flow through a system according to an embodiment of the present invention. The closed-caption 101, cclist.txt, is passed to a natural language analysis tool 102, for example, linguist_egs developed by Inxight Software, Inc. and Xerox Corporation. According to an embodiment of the present invention, noun phrases and proper nouns (denoted as phrases) in closed-captions are extracted and saved in a file 103, e.g., "cclist_np.txt".

Each phrase generated may include one or more natural words. Each word is treated independently as one feature item for story classification while the entire phrase would play the role of the basic feature unit in the task of relevant story grouping.

The noun phrase file "cclist_np.txf" is passed to a word-code translation tool called datagen. A word-code translation tool assigns each different word a unique code from an internal dictionary called "wordtable.txt". wordtable.txt covers the words appearing in the "cclist_np.txt" and is updated upon determining a new word. The output 105 of datagen provides source data for the tasks of story classification 110 and grouping 114, and is stored as "newsitem.txt" (shown in Appendix A).

For story classification 110, training 107 (off-line in a batch mode) and testing 111 (on-line), examples are generated by the tool inputgen 106. A story classification knowledge network 109 is generated from training examples 107 input to the training module and modified thereafter for each new story in a supervised manner. The process of class prediction 112 and knowledge base modification is realized interactively on a news organizer platform such as the Multimedia Video News Organizer.

Relevant story grouping 114 takes a story location 105 (directory, first frame No., etc.) and corresponding story grouping files 113 (one per each story class) as input and determines a group 115 for the new story. A new group is assigned if no well-matched groups are found. Thereafter the related story-grouping file is updated interactively.

Figure 2:
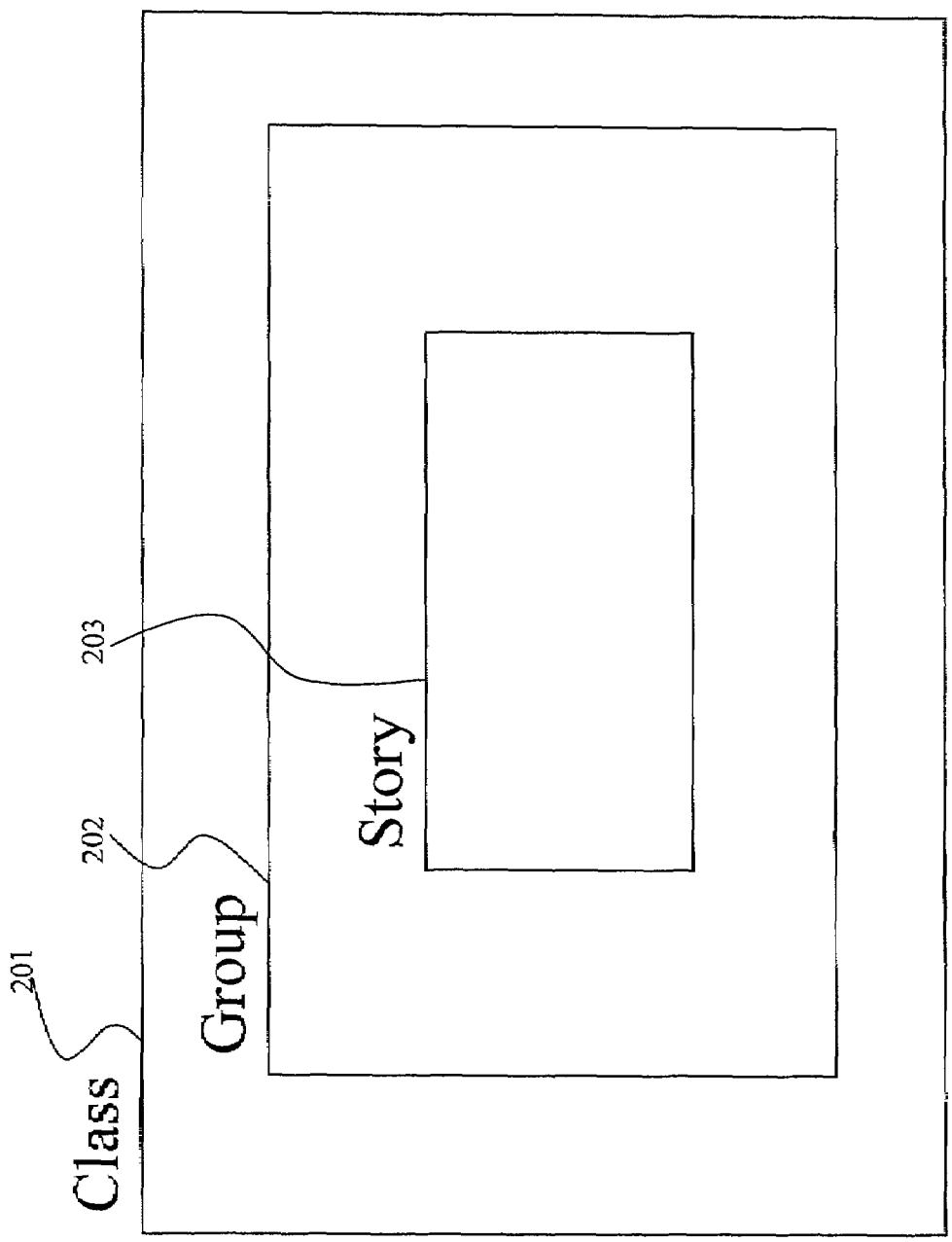
FIG. 2 is an illustration of the hierarchy of classes, groups and stories according to an embodiment of the present invention.

Referring to FIG. 2, the hierarchical structure of the stories is as follows: each class 201 includes at least one group 202, and each group 202 within the class 201 includes at least one story 203.

Three Bayes based methods (denoted as bayes, bayes_2 and bayes_3) and one Winnow-based method (denoted as SNoW) were developed for news story classification according to the present invention. Bayes' theorem provides a mathematical method for determining, given occurrences in prior trials, the likelihood of a target occurrence in future trials. According to Bayesian logic, the only way to quantify a situation with an uncertain outcome is through determining its probability. The basic Bayes' theorem is a means of quantifying uncertainty. Based on probability theory, the theorem defines a rule for refining an hypothesis by factoring in additional evidence and background information, and leads to a number representing the degree of probability that the hypothesis is true.

Each classification method, bayes, bayes_2, bayes_3 and SNoW, share the same method for representing feature items, which are organized as a sequence of integer codes, such as:

3,238,1635,14,168,325,171,326(1.4),327(1.4),1996, 1997,18,19,20,1998, 431,3098,432,6009,346,931:

Each classification method begins with a class label, if assigned, and ends with a ":". Feature codes, corresponding to feature items or words in the news, are separated by ",", and weighted by the values (other than 1) in the parenthesis, if any. In this system, class labels are coded from 1 to 10 and feature items are coded from the value of "11", so for the story without a label, its representation would start with a value μ11. One of ordinary skill in the art would appreciate that the coding can be changed depending on the application. In addition, for the sake of programming convenience, the value of (class label—1) is the class code in the example representation. For example, "0" represents Politics news and "3" represents weather news as shown in Table 1.

Table 1 shows class labels for grouping news stories:

TABLE 1

| Class Label | 1 | 2 | 3 | 4 | 5 | 6 | 7 | 8 |
|---|---|---|---|---|---|---|---|---|
| Class Name | Politics | Daily Incidents | Sports | Weather | Health | Entertainment | Business | Science and Technology |

The number of feature items for each news story may vary significantly up to several hundred. However, experiments have shown that the first several items, for example, twenty, are sufficient to characterize the news categories. Therefore, according to an embodiment of the present invention, the first twenty unique feature items are adopted to represent the stories. One of ordinary skill in the art would recognize that the number and scope of feature items can vary, for example, take every third feature item for a total of 15 feature items. In order to take advantages of the fact that some feature items may appear more than once in a story, a weight defined as √frequency can be assigned to each feature item. Typically, the proper nouns have been observed to appear at least twice in the "cclist_np.txt", therefore the above formula can be adjusted to $$\sqrt{\frac{frequency+1}{2}}.$$

Statistics-based class prediction (bayes decision network) determines a maximum conditional probability $P(c_1|f_1, f_2 \ldots f_n)$, where $c_i$ is the class $i=1,2,3 \ldots 8$ and $f_{(s)}$ is the set of feature items. According to the Bayes decision rule $$P(c_i|f_1, f_2 \ldots f_n) = \frac{P(c_i|f_1, f_2 \ldots f_n)P(c_i)}{P(f_1, f_2 \ldots f_n)}$$

and the conditional independent assumption of feature items given the class label, the classification task can be defined as seeking for a class i which may maximize the value of:

$$\log\{P(f_1, f_2 \ldots f_n)P(c_i)\} = \sum_{j=1}^{n}\log\{P(f_j|c_i)\} + \log\{P(c_i)\}$$

The prior $P(c_i)$ can be determined by determining the percentage of stories for each class in the training set. The value of $P(f_j|c_i)$ is defined as the occurrence frequency of feature items j given class i in the entire training set. The value of $P(f_j|c_1)$ for many pairs of i and j is zero. For the computational convenience, all "zero" values are replaced by a probability value □, which is defined as 1 divided by the number of training examples.

Majority voting among significant feature items is implemented by bayes_2. The majority voting is based on the premise that the more likely the individual feature items belong to a single class the more likely it becomes that the story belongs to that class. A feature item j is said to be a significant feature for class i if and only if $P(c_i|f_j)>0.5$, in which case the class i obtains a vote from the feature j. The task of story classification is to determine the class with the maximum number of votes from the feature items in the unknown story. The value of $P(c_1|f_j)$ is computed as the percentage of the stories with feature item j which is labeled as class i in the training sample set.

Likelihood summation among feature items is implemented by bayes_3. Similar to the majority voting, the story classification task of the likelihood summation is realized based on the computation of the values of $P(c_i|f_j)$. However, the difference is that the classification decision here is made based on the sum of the weighted $P(c_i|f_j)$, rather than the number of votes in the previous one. To realize this, a likelihood score $S_i$ is defined for each class i as:

$$S_i = \sum_{j=1}^{n} p(c_i|f_j)^2 \{\log(m_j) + 1\}$$

where $m_j$ is the total number of stories with feature item j in the training sample set. Such a score definition shows the following facts: the story classes with large likelihood values in some feature items, that is, $P(c_i|f_j) \approx 1$, would be preferred. On the other hand, feature items with an insignificant likelihood value ($P(c_i|f_j) \approx 0$ or ⅛) contribute little to the accumulated score $S_i$. Further, frequently appeared feature items (large values of $m_j$) would play a more important role in the final decision, because the more frequently a feature item appears in the training example, the more accurate the computed values of $P(c_i|f_j)$ would be. Accuracy is a measure of the likelihood values relative to real work observations.

Figure 3:
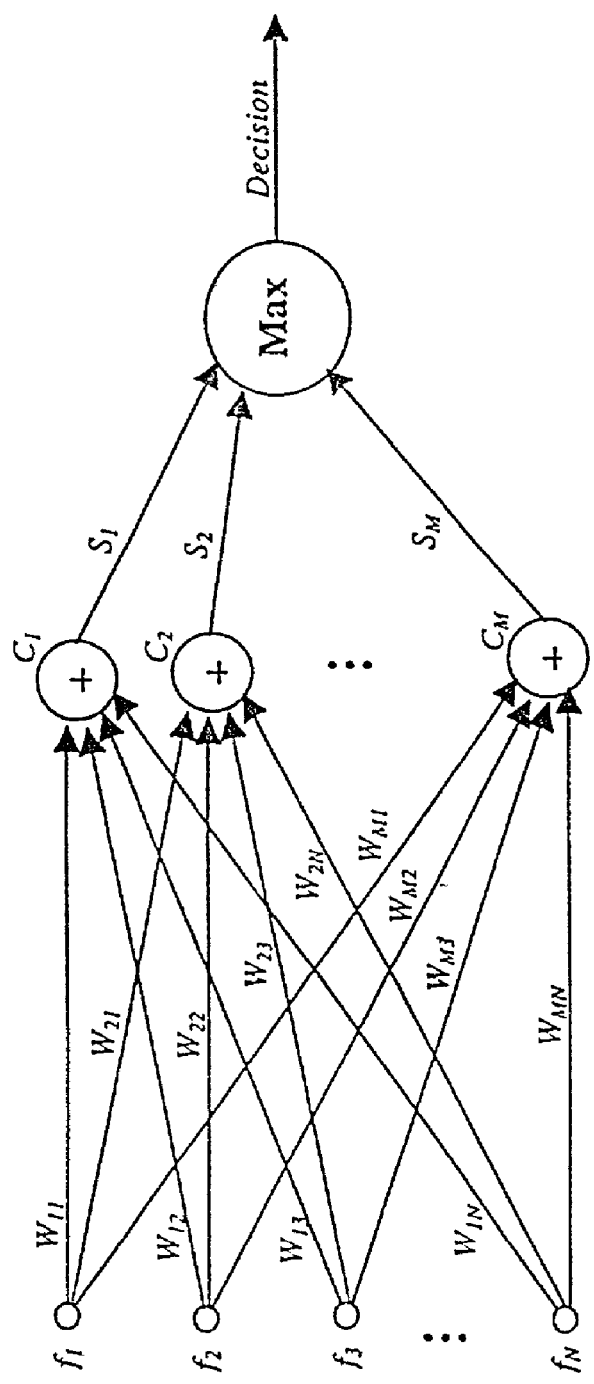
FIG. 3 is an illustrative view of the SNoW according to an embodiment of the present invention.

SNoW (sparse network of winnows) is a linear learning architecture developed by Professor Dan Roth in the University of Illinois at Urbana-Champaign in 1999. An illustrative overview of SNoW is shown in FIG. 3. The input layer includes the entire set of feature items. The output layers correspond to the possible categories. Each pair of input node $f_j$ and output node $C_i$ is connected with a weight of $W_{ij}$. $W_{ij}=0$ if the feature item j has never appeared in class i in the training examples. Given an unknown example $E=(f_1, f_2, \ldots f_n)$, a set of decision scores $S_i$ are determined according to:

$$S_i = \sum_{j=1}^{n} f_j W_{ij}$$

where $f_j$ are the feature weights previously defines in the example representation. A "winner-take-all" scheme is employed to determine the final output label among the candidate classes.

In the network weights updating process, three predefined parameters are introduced:

θ: Internal activation threshold. For a given example, an output node is said to be internally activated if $S_i>\theta$. An output node is said to be externally activated if it is the real label.

α: Promotion rate (α>1).

β: Demotion rate (β<1).

Given a labeled example, the network weight $W_{ij}$ is updated according to the following criteria:

$W_{ij}$ is promoted by a factor of α if an only if the output node i is both internally inactivated and externally activated. In addition, the input node i must be a member in the input feature set; and $W_{ij}$ is demoted by a factor of β if and only if the output node i is both internally activated and externally inactivated. In addition, the input node i must be a member in the input feature set.

According to an embodiment of the present invention, each input node represents a unique feature item, the amount of which is changed dynamically, and each output node corresponds to a story classes (from class 1 to class 8). The source code for SNoW was downloaded from the website http://L2R.cs.uiuc.edu/~cogcomp/.

Figure 4:
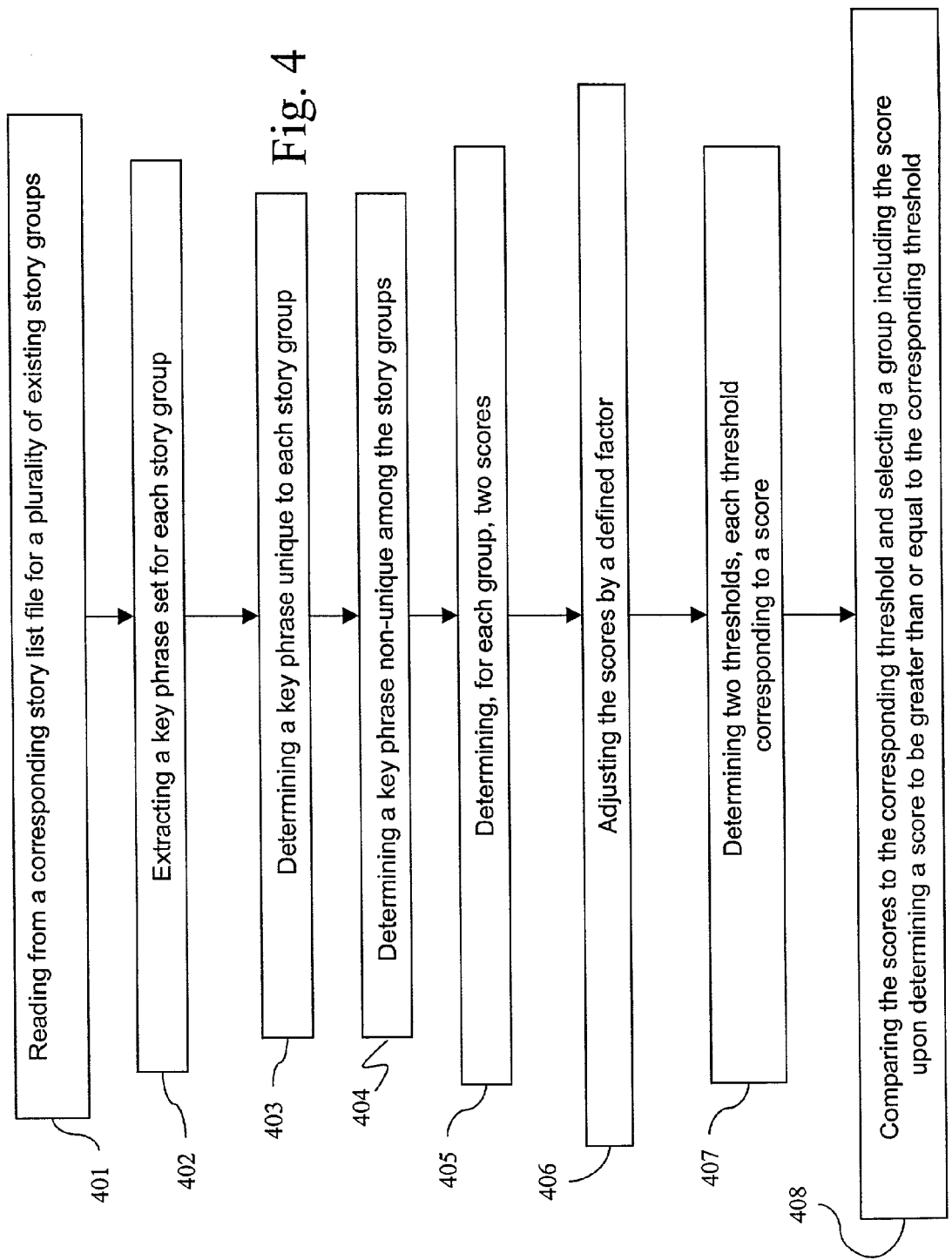
FIG. 4, is a flow diagram of a method of story-grouping according to an embodiment of the present invention.

Referring to FIG. 4, the relevant story-grouping method is based on the premise that relevant stories share common key phrases, such as the name of a person, an organization, a location, etc. Therefore, the basic feature unit for relevant story-grouping is the set of feature items (phrases), rather than each single feature item (word). Given a labeled story, the method identifies an existing relevant group by reading from a corresponding story list file for the existing story groups 401. Eight story list files, one for each story class, are maintained to record the up-to-date story grouping information. A set of "key phrases" for each group is extracted 402. A phrase is said to be a "key phrase" of that group if and only if it is shared by at least ⅔ component stories. Key phrases that appear in the key phrase set of two or more groups are defined as "non-unique" marks 404. The remaining key phrases are defined as unique key phrases. Alternatively, unique key phrases can be affirmatively defined 403.

For each group, two scores, $S_{unique}$, and $S_{non-unique}$, are computed 404 as the sum of the length of the matched key phrases, based on a number of component words in each matched key phrase, between the new story and each group's key phrase set (with or without the non-unique marks, respectively). Scores are then adjusted by a factor of 4log(m)+1 405, where m is the number of components in that group, to make the grouping more favorable to the large set of groups. Other factors can be used to adjust the scores, these can be determined through routine experimentation. Two thresholds, $ℏ_{unique}$, and $ℏ_{non-unique}$, are a set for comparing the scores against 406. The method denotes the two highest scores as $S_{unique}'$ and $S_{non-unique}'$ and the groups with the highest scores as $G_{unique}$ and $G_{non-unique}$. $G_{unique}$ would be selected if $S_{unique}'\mu ℏ_{unique}$; otherwise, $G_{non-unique}$ is the choice if $S_{non-unique}'\mu ℏ_{non-unique}$ 307. The system will return a "0" is none of the above two conditions are met.

Twenty-two videos (425 pieces of stories) from CNN® used to test the present invention. Each piece of news was manually labeled according to the definition of classes above. A set of randomly selected stories (e.g., 10~80%) were used as training examples and the remaining stories for testing. An average correct-prediction rate in 100 repeated experiments was collected for each of the four methods under the different training/testing example division ratios.

Figure 5:
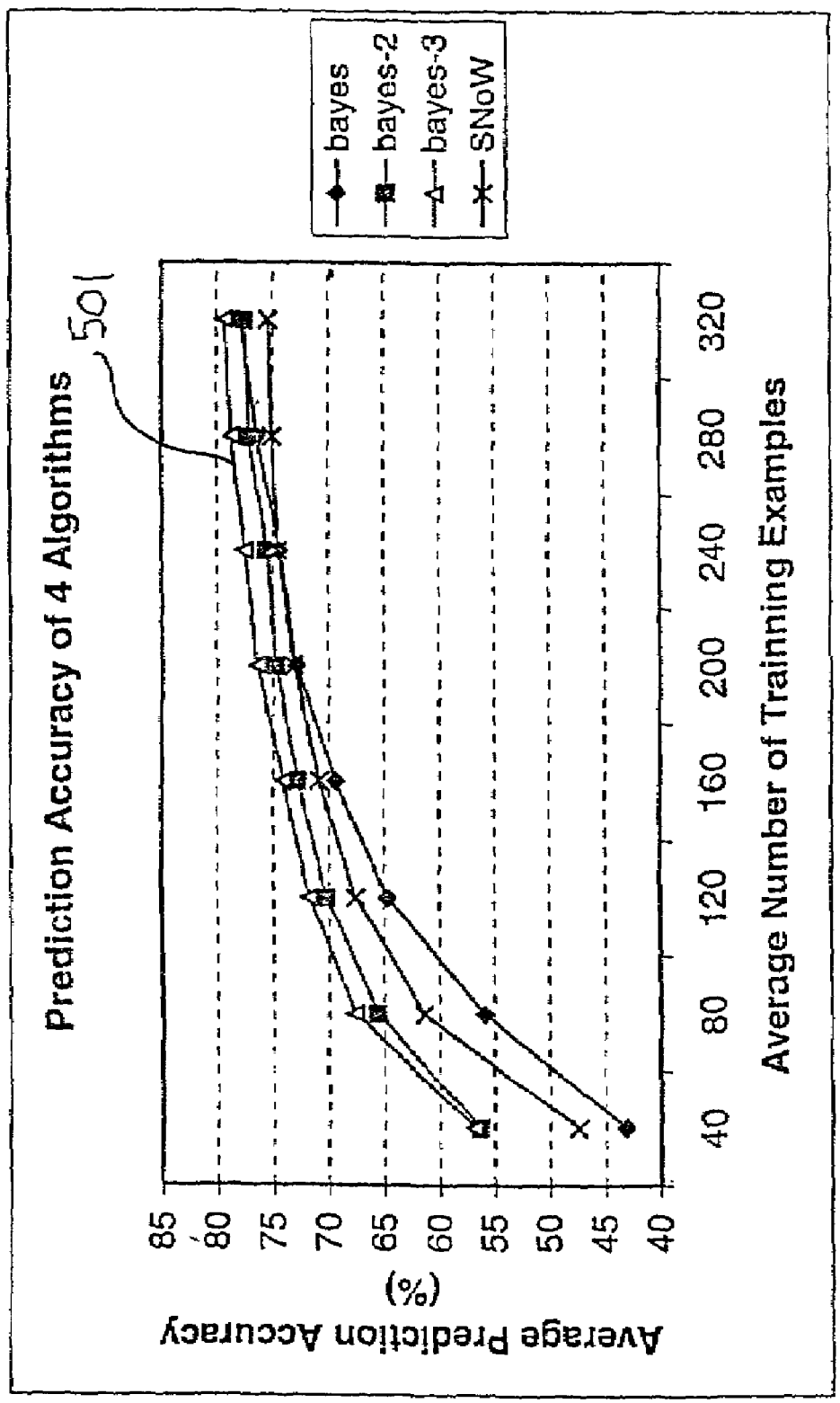
FIG. 5 is a graph showing the prediction accuracy of various methods.

FIG. 5 depicts the curves of the overall prediction accuracy for the methods described above. The curves reveal that "bayes-3" 501, the likelihood summation approach, achieves the best performance that approaches 80% for 320 training examples, and prediction accuracy is improved monotonically, however nonlinearly, with increases in the number of training examples. According to the improving trend obtained from the experiment, the story classification accuracy (bayes-3) can be expected to reach 83% for 640 training examples and over 90% if 3000 examples were available for the training purposes.

TABLE 2

|  | Count | 1 | 2 | 3 | 4 | 5 | 6 | 7 | 8 | Recall Rate (%) |
|---|---|---|---|---|---|---|---|---|---|---|
| 1-Politics | 83 | 76 | 7 | 0 | 0 | 0 | 0 | 0 | 0 | 91.6 |
| 2-Daily Incidents | 77 | 23 | 50 | 0 | 2 | 0 | 2 | 0 | 0 | 64.9 |
| 3-Sports | 59 | 2 | 1 | 56 | 0 | 0 | 0 | 0 | 0 | 94.9 |
| 4-Weather | 18 | 1 | 1 | 0 | 16 | 0 | 0 | 0 | 0 | 88.9 |
| 5-Entertainment | 4 | 2 | 2 | 0 | 0 | 0 | 0 | 0 | 0 | 0 |
| 6-Health | 28 | 2 | 2 | 0 | 2 | 0 | 22 | 0 | 0 | 78.6 |

TABLE 2-continued

|  | Count | 1 | 2 | 3 | 4 | 5 | 6 | 7 | 8 | Recall Rate (%) |
|---|---|---|---|---|---|---|---|---|---|---|
| 7-Business | 43 | 4 | 3 | 0 | 0 | 0 | 0 | 36 | 0 | 83.7 |
| 8-Sci.& Tech. | 5 | 2 | 3 | 0 | 0 | 0 | 0 | 0 | 0 | 0 |
| Sum | 317 | 112 | 69 | 56 | 20 | 0 | 24 | 36 | 0 |  |
| Precision (%) |  | 67.9 | 72.5 | 100 | 80 | 0 | 91.7 | 100 | 0 |  |

Table 2 shows detailed information about the classification confusions that occurred in a successive of four independent experiments (with 80% training examples). The underlined number represent the real number of the testing stories, and the remaining numbers are the statistics of the predictions. The recall rates reflects the number of stories correctly labeled for each category. The precision value for each category reflects the accuracy of each prediction. The performance of each category can be analyzed as follows:

High precision and recall rates were achieved in the categories of "Sports", "Weather", "Health" and "Business". A reasonable explanation is that the languages used in these categories generally share some common features (e.g., noun phrase usage) within each category. In most cases, the story labeling for these categories can be done based on their respective key words list rather than reading entire stories.

"Entertainment" and "Science and Technology" resulted in poor performance in both precision and recall rate. An insufficient number of training examples is an important factor resulting in the poor performance. In addition, the languages used in these two categories are as unique as that in the above four categories. Generally, is can be difficult to label the stories without reading through the detailed story.

The language feature used in "Politics" stories is salient and that is one reason why "Politics" achieved a high recall of 91.6%. However, the precision of "Politics" is lower than recall (based on percentages) because a large number of "Daily Incidents" stories were predicted as "Politics". This also leads to a fair precision and recall rate for "Daily Incidents". The reason is simple and straightforward: "Daily Incidents" is actually a vague concept which may cover a wide range of stories and in addition, "Daily Incidents" does not have its own characteristic language.

Based on the above analysis, to further improve the classification performance the categories may be rescheduled and/or additional video news can be obtained for additional training. Rescheduling the categories includes, for example, canceling the category of "Science and Technology" and "Entertainment", and incorporating the corresponding stories into "Health", "Business" or "Daily Incidents".

For the task of story classification, our knowledge base is stored in a file (bayes.net), which is loaded every time a new classification is made, and updated thereafter. Therefore, the only computational work needed in the classification is the knowledge base file reading and one round of the knowledge base scan, both of which only impose a linear time complexity to the size of the training examples.

The time complexity for the relevant story-grouping method can be difficult to estimate. However, since the number of components (relevant stories) in each story group will not expand unlimitedly, the computational complexity would be modeled as linear to the number of story groups, which may not be a burden in real application.

The tools of story classification and grouping are embedded into the Multimedia Video news Organizer described above. Two menu items ("Classify" and "Story Grouping", respectively) are added into the functional menu that is activated by, for example, a double-click on the left mouse button.

For clip on Classify, the client side would locate the clicked story and then do the following operations:

1. Call the tool "inputgen" to generate the story example according to the file "newsitem.txf" and store the result in the "test.feat";
2. Call the tool "bayes_dec" for classification, and result is stored in the file "bayes_out.txt";
3. The client side then reads the file "bayes out.txt" and displays a dialog containing the list of story categories, which is initialized with the result stored in "bayes_out-.txt"; and
4. The user may change the category choice and modify the story title (default is "New Story") in this dialog window. Upon the "Set" button is clicked, the chosen category would be committed and the knowledge base ("bayes. net") is then updated by another call to the toll "bayes_dec". The modification to the category and story titles would also be written to the file "newsitem.txt." upon the exit of the video organizer.

Note that "bayes_dec" is a modified version of the method "bayes-3", in which the knowledge base on-line updating function is realized. To embed other methods (bayes, bayes-2 or SNoW) into the system, a corresponding interface and modification of the method, similar to that for "bayes-3", should be developed. One with ordinary skill in the art would appreciate that the modification of the method and interface can be accomplished in a number of ways within the scope of the present invention. Also, the dialog window will not be displayed if the story does not include any phrases in the file "cclist_np.txt".

For clip on Story Grouping, the client side first determines whether the clicked story has a valid category label. If it has, the following operations are conducted:

1. Call the tool "storygroup" for the grouping. The result is written to the file "group_output.txt";
2. Reads the output file and displays a dialog window including the list of story groups in the file "list_xx.txt", where xx indicates one of the eight categories. The group list is initialized with the output of "storygroup" and can be changed by the use later on;
3. Double-click on any group item, and a window including the list of stories in that group will be displayed. Users may choose to play stories by double clicking each story item in the list; and 4. Upon the "Set" button in the grouping window is clicked, the corresponding grouping file "list_xx.txt" would be updated right away.

The following Video Organizer related files are located in the same directory where the JAVA project "VideoOrganize" is stored. The Executables includes, inter alia:

datagen: generates the coded version of the cclist_np.txt. The command format is datagen dir, where dir is the directory of the video news. The files to be read include, cclist_np.txt, wordtable.txt and the output files include newsitem.txt and the updated wordtable.txt.

inputgen: generates input examples for bayes_dec or other off-line training tools. The command format can be as follows: in Mode 1, inputgen dir; in Mode 2, inputgen dir first_frame seq_num; in Mode 3, inputgen dir first_frame seq_num label, wherein "dir" is the directory of the video news, "first_frame" is the first frame number of the corresponding story, "seq_num" is the sequential number of the stories with the same starting frame number, which is typically "1", and "label", the label assigned to the story.

Mode 1 generates a batch of story examples. Mode 2 generates one story example without label for classification. Mode 3 generates a labeled story for knowledge base updating.

inputgen reads newsitem.txt and outputs to train.feat for Mode 1, test.feat for Modes 2 and 3.

bayes_dec: functions as a means for story classification and knowledge base updating. The different functional mode is determined by whether the first value in the file test.feat is a feature or a class label. Story classification is executed upon the first value being a feature. The knowledge base is updated if a class label is found. The command format of bayes_dec is bayes_dec. bayes_dec reads from test.feat and bayes.net and outputs to bayes_out.txt for the story classification mode and bayes.net for the knowledge base updating mode.

storygroup: groups relevant stories. storygroup can be used in the following format: storygroup dir first_frame seq_num label, using the parameter descriptions above used in reference to inputgen. storygroup reads from newsitem.txt and list_xx.txt where xx can be one of: pol, inc, spt, wea, ent, hel, bus and tec, each of which represents a category. storygroup outputs to group_output.txt.

The present invention contemplates an internal database including, inter alia:

test.feat: generated by inputgen and including the input example for bayes_dec.

bayes.net: a knowledge base for the story classification, see Appendix C for a description.

bayes_out.txt: including the decision output from bayes_dec.

group_output.txt: including the decision output from storygroup, see Appendix D for description.

wordtable.txt: a code-lookup table for the entire set of words.

list_xxx.txt: list of story groups in an individual area, for example, list_pol.txt is a list of story groups in Politics, see Appendix B for a description.

The following files reside in the same directory as the corresponding video news:

cclist_np: includes noun phrase in "cclist.txf". A modification of this file may be needed before the generating newsitem.txt. For example, some phrases such as "CNN Headline News", which is actually unrelated to any categories of news, should be removed from the cclist_np.txt if those are included in stories.

newsitem.txt: is a code version of cclist_np.txt, see Appendix A for a description.

train.feat: includes the story examples in the directory.

In addition to the Video Organizer related software, some other auxiliary tools and methods developed are stored (source code). The executables include, inter alia:

wholegen: which combines the files "train.feat" in each video news directory together to be an entire example set "whole.feat". The format of wholegen is as follows: wholegen dir start_num end_num. Each video is a directory called \news-xx, where xx starts from the number 0. "dir" is the previous level directory of the video news. "start_num" is the starting sequential number of the videos news. "end_num" is the ending sequential number of the videos news.

wholegen reads from train.feat files in the video directories from "start_num" to "end_num" and outputs to whole.feat, combining the examples from "start_num" to "end_num".

sam_div: randomly divides the entire sample set whole.feat into the training set and testing set. This tool is for the purpose of repeated method off-line training and testing. The command format is as follows: sam_div dir ratio, where "dir" is the directory where whole.feat resides and "ratio" is the percentage of the testing example to be assigned. The function reads from whole.feat and outputs to train.feat and test.feat in the same directory as whole.feat. Note that the file train.feat is different from the files train.feat in each video directory described above.

bayes, bayes_2, bayes_3: story classification methods. The command format is bayes (bayes_2 or bayes_3) dir, where "dir" is the directory including the training and testing example files. The executables read from train.feat and test.feat and output to result.txt.

whole.feat includes an entire set of all the story examples. train.feat as generated by sam_div, includes the training examples. test.feat as generated by sam_div, includes examples for testing. result.txt includes statistics of the prediction results for the testing examples.

SNoW is a software package developed by Professor Dan Roth at the University of Illinois at Urbana-Champaign.

The present invention can be extended to handle a variety of different problems, for example, categorizing web content. As the popularity of Internet grows, more and more web content has been created. In order to enable a user who enters a web site to find information more effectively, most web sites index content using various key words and a category hierarchy. For example, www.yahoo.com uses a category hierarchy, not only for searches, but also for browsing. According to an embodiment of the present invention, an indexing method, similar to the news story classification method above, extracts keywords or key phrases from a web page, and decides which category or sub-category to associate the web page with. If there is no sub-category that best fits this page, the method creates a new sub-category. Here, a category hierarchy is used instead of a flat category set.

Having described embodiments for a method of automatic news story classification and relevant story grouping, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

| Target | 0 | 98 |
| --- | --- | --- |
| 0 | 865 | 3 |
| 0 | 868 | 9 |
| 0 | 869 | 11 |
| 0 | 33 | 29 |
| 0 | −1 | 0 |
| Target | 1 | 93 |
| 1 | 23 | 2 |
| 1 | 24 | 2 |
| 1 | 33 | 21 |
| 1 | 34 | 2 |
| 1 | −1 | 0 |
| Target | 2 | 67 |
| 2 | 675 | 3 |
| 2 | 676 | 3 |
| 2 | 865 | 3 |
| 2 | −1 | 0 |

What is claimed is:

1. A method of content grouping according to a corresponding text comprising the steps of:
reading from a content list file for a plurality of content groups;
extracting a key phrase set for each content group;
determining a set of unique key phrases and a set of non-unique key phrases from each group;
determining, for each content group, a unique score and a non-unique score;
determining a unique threshold and a non-unique threshold; and
selecting a content group according to a comparison between the scores and the thresholds comprising,
comparing the unique score to the unique threshold and selecting a content group including the unique score upon determining the unique score to be in accordance with the unique threshold,
comparing the non-unique score to the non-unique threshold upon determining that the unique score is not in accordance with the unique threshold, and selecting a content group including the non-unique score upon determining the non-unique score to be in accordance with the non-unique threshold, and
creating a new content group upon determining that neither score to be in accordance with its corresponding threshold.

2. The method of claim 1, wherein the unique score is determined according to a sum of the length of the set of unique key phrases, wherein the set includes zero or more unique key phrases.

3. The method of claim 1, wherein the non-unique score is determined according to a sum of the length of the set of non-unique key phrases, wherein the set includes zero or more non-unique key phrases.

4. The method of claim 1, further comprising the step of adjusting the unique score and non-unique score by a predefined factor.

5. The method of claim 4, wherein the factor is 4 log(m)+1, where m is the number of components in that content group.

6. The method of claim 1, wherein the content is one of web page content and news stories.

7. The method of claim 1, wherein the text is provided by a closed-caption.

8. The method of claim 1, wherein the key phrases include at least one noun.

9. A program storage device readable by machine, tangibly embodying a program of instructions executable by the machine to perform method steps for content grouping based on a corresponding text, the method steps comprising:
reading from a content list file for a plurality of content groups;
extracting a key phrase set for each content group;
determining, for each content group, a unique score and a non-unique score;
determining a unique threshold and a non-unique threshold; and
selecting a content group according to a comparison between the scores and the thresholds comprising,
comparing the unique score to the unique threshold and selecting a content group including the unique score upon determining the unique score to be in accordance with the unique threshold,
comparing the non-unique score to the non-unique threshold upon determining that the unique score is not in accordance with the unique threshold, and selecting a content group including the non-unique score upon determining the non-unique score to be in accordance with the non-unique threshold, and
creating a new content group upon determining that neither score to be in accordance with its corresponding threshold.

10. The method of claim 9, wherein the unique score is determined according to a sum of the length of the set of unique key phrases, wherein the set includes zero or more unique key phrases.

11. The method of claim 9, wherein the non-unique score is determined according to a sum of the length of the set of non-unique key phrases, wherein the set includes zero or more non-unique key phrases.

12. The method of claim 9, further comprising the step of adjusting the unique score and non-unique score by a predefined factor.

13. The method of claim 12, wherein the factor is 4 log(m)+1, where m is the number of components in that content group.

* * * * *